United States Patent
Przybyla et al.

(10) Patent No.: US 7,471,441 B1
(45) Date of Patent: Dec. 30, 2008

(54) FLEXURES

(75) Inventors: James R. Przybyla, Corvallis, OR (US); Kenneth Faase, Corvallis, OR (US); Adel Jilani, Corvallis, OR (US); James C. McKinnell, Corvallis, OR (US); Eric L. Nikkel, Corvallis, OR (US); Arthur Piehl, Corvallis, OR (US); Bao-Sung Bruce Yeh, Corvallis, OR (US); Michael G. Monroe, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 160 days.

(21) Appl. No.: 11/450,639

(22) Filed: Jun. 9, 2006

(51) Int. Cl.
*G02B 26/00* (2006.01)
*G02B 26/08* (2006.01)

(52) U.S. Cl. .................. 359/290; 359/198; 359/224

(58) Field of Classification Search ................ 359/198, 359/212, 214, 223, 224, 247, 290, 295, 298, 359/302
See application file for complete search history.

(56) References Cited

U.S. PATENT DOCUMENTS

| | | | |
|---|---|---|---|
| 4,710,732 A | 12/1987 | Hornbeck | |
| 5,083,857 A | 1/1992 | Hornbeck | |
| 5,192,395 A | 3/1993 | Sampsell et al. | |
| 5,486,698 A | 1/1996 | Hanson et al. | |
| 5,512,748 A | 4/1996 | Hanson | |
| 5,661,591 A | 8/1997 | Lin et al. | |
| 5,673,139 A | 9/1997 | Johnson | |
| 5,751,469 A | 5/1998 | Arney et al. | |
| 5,825,528 A | 10/1998 | Goossen | |
| 5,920,417 A | 7/1999 | Johnson | |
| 6,020,272 A | 2/2000 | Fleming | |
| 6,091,050 A | 7/2000 | Carr | |
| 6,123,985 A | 9/2000 | Robinson et al. | |
| 6,275,324 B1 | 8/2001 | Sneh | |
| 6,329,738 B1 | 12/2001 | Hung et al. | |
| 6,341,039 B1 | 1/2002 | Flanders et al. | |
| 6,351,330 B2 | 2/2002 | Ko et al. | |
| 6,466,356 B1 | 10/2002 | Peeters et al. | |
| 6,504,643 B1 | 1/2003 | Peeters et al. | |
| 6,529,311 B1 | 3/2003 | Bifano et al. | |
| 6,545,796 B1 | 4/2003 | Greywall | |
| 6,657,764 B1 | 12/2003 | Smits | |
| 6,836,366 B1 | 12/2004 | Flanders et al. | |
| 6,906,848 B2 | 6/2005 | Aubuchon | |
| 7,365,899 B2* | 4/2008 | Gim et al. ............. | 359/295 |
| 2002/0024711 A1* | 2/2002 | Miles ............. | 359/247 |

* cited by examiner

*Primary Examiner*—William C Choi

(57) ABSTRACT

Various embodiments of a MEMs structure including flexures movably supporting a reflective face are disclosed.

11 Claims, 14 Drawing Sheets

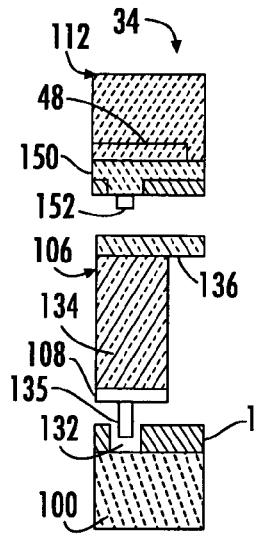
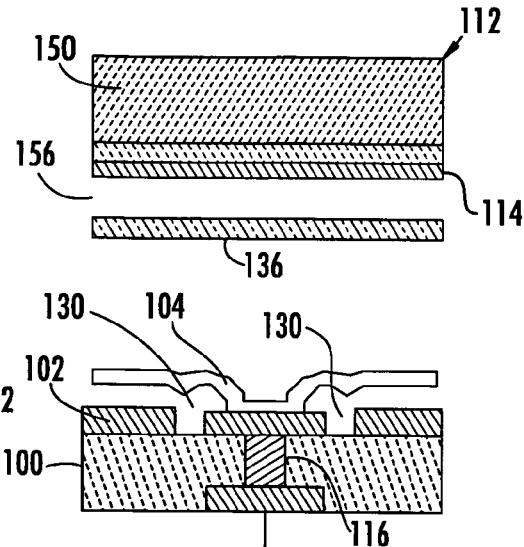
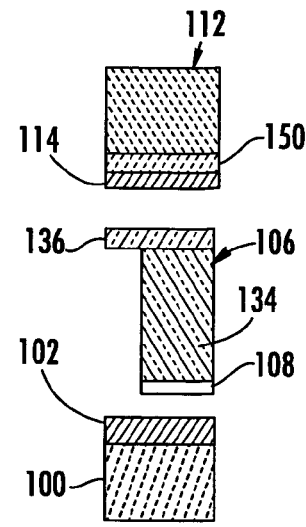
FIG. 4A
FIG. 4B
FIG. 4C
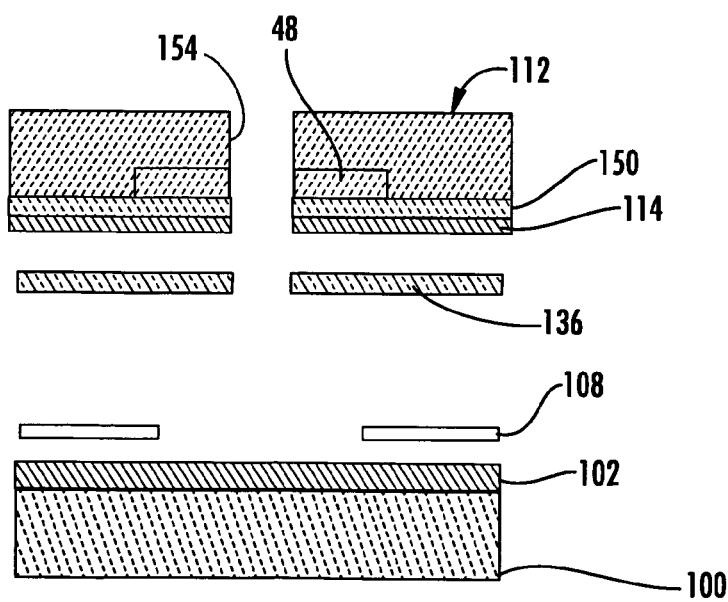
FIG. 4D

FLEXURES

CROSS REFERENCE TO RELATED APPLICATION

The present application is related to copending U.S. patent application Ser. No. 11/450,544 filed on the same date by James R. Przybyla, Bao-Sung B. Yeh, Kenneth J. Faase, Arthur R. Piehl, James C. McKinnell, Adel B. Jilani, Michael G. Monroe and Eric L. Nikkel and entitled FLEXURES, the full disclosure of which is hereby incorporated by reference.

BACKGROUND

Flexures are utilized in micro electromechanical systems (MEMS) to movably support one member relative to another member. For example, flexures have been utilized to support micro mirrors of light modulators in various displays or projectors. Current flexure designs may suffer from fatigue due to high internal strains and may inefficiently occupy space in MEMS.

BRIEF DESCRIPTION OF THE DRAWINGS

FIGS. 4A, 4B, 4C and 4D are sectional views of the pixel of FIG. 3 taken along lines 4A-4A, 4B-4B, 4C-4C, and 4D-4D, respectively, according to an example embodiment.

FIGS. 8A, 9A, 10A, 11, 12A, 13A, 14A, 15A, 16A, 17, 18A, 21A and 22A are sectional views schematically illustrating forming of the pixel of FIG. 3 along lines 4A-4A, 4B-4B and 4C-4C according to an example embodiment.

DETAILED DESCRIPTION OF EXAMPLE EMBODIMENTS

Figure 1:
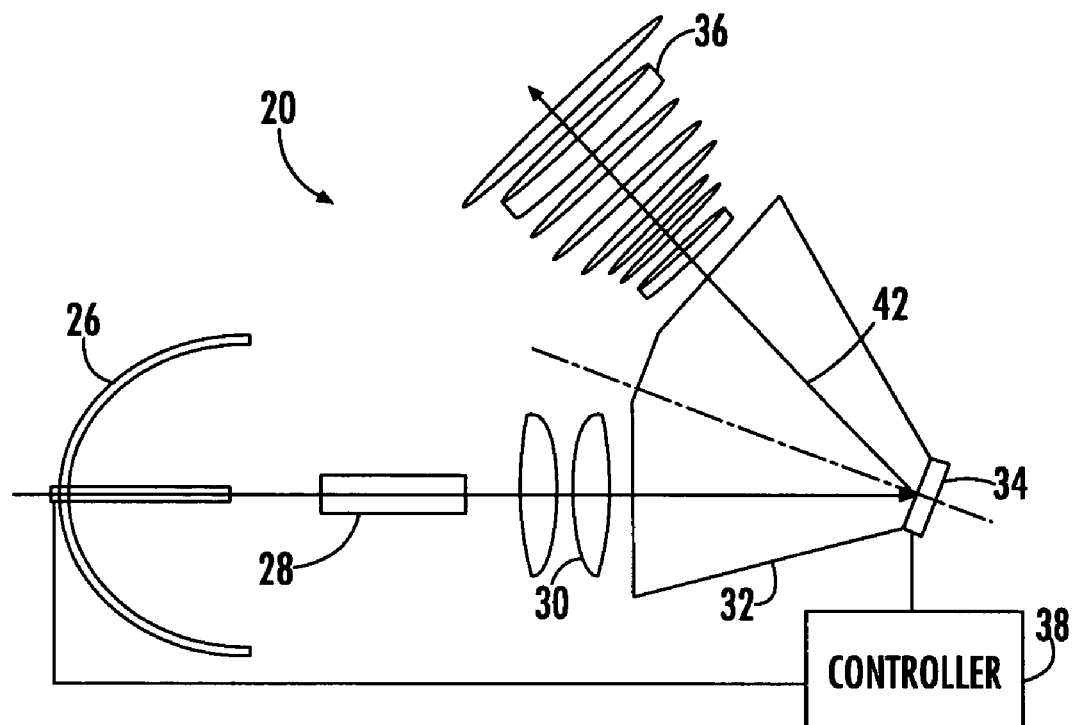
FIG. 1 is a schematic illustration of one example of an electronic device including a light modulator according to an example embodiment.

FIG. 1 schematically illustrates one example of an electronic device (shown as a display system 20) including light modulator 34. In addition to light modulator 34, display system 20 includes light source 26, integrator 28, condenser lens 30, prism 32, projection lens 36 and controller 38. Light source 26 directs light towards modulator 34. Integrator 28 integrates the light. Condenser lens 30 condenses the light such that the light travels through prism 32 and onto modulator 34.

Modulator 34 may comprise a micro-machine light modulator including electro-statically actuated optical cavities. Modulator 34 varies intensity and color modulation within each of a plurality of pixels. As will be described in greater detail hereafter, each pixel acts as a Fabry-Perot filter including a partial reflecting film, a tunable optical cavity and a strongly reflecting film. By controlling the size of each optical cavity, hues and intensities can be modulated without resorting to color wheels, dedicated pixels for each primary hue or polarized light. Interference from the two reflectors causes a narrow band filter that is used to select primary colors by varying the gap between the reflectors. The gap is controlled by balancing a flexure force and an electrostatic force between the two reflectors. As the gap is narrowed, absorption occurs and a black state can be achieved.

As indicated by arrow 42, light reflected from modulator 34 passes through prism 32 and through projection lens 36. Projection lens 36 comprises a series of one or more optical lenses which focus and direct the light reflected from modulator 34 onto a display surface (not shown).

Controller 38 comprises a processor unit configured to generate control signals to direct the operation of at least light source 26 and modulator 34. For purposes of the disclosure, the term "processor unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hardwired circuitry may be used in place of or in combination with software instructions to implement the functions described. Controller 38 is not limited to any specific combination of hardware circuitry and software, nor to any particular source for the instructions executed by the processing unit.

In the particular embodiment shown, controller 38 generates control signals based upon received image data. The control signals tune the optical cavities of the individual pixels based upon the image data such that the light reflected from modulator 34 has a hue and intensity matching the image to be displayed. This reflected light is further refined by projection lens 36.

Although modulator 34 is illustrated as being incorporated into a display system 20 which comprises a projector, modulator 34 may alternatively be incorporated into other display systems such as wearable displays, cameras, cell phones, electronic paper, personal data assistants (PDAs), and the like.

Figure 2:
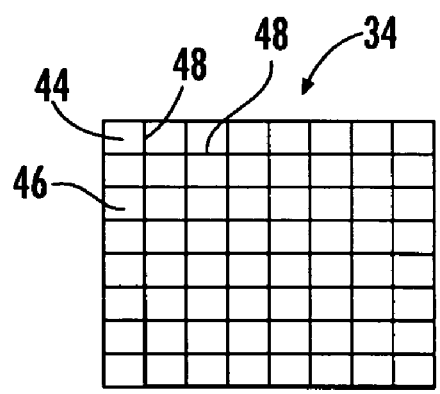
FIG. 2 is a front plan view of the light modulator of FIG. 1 according to an example embodiment.

As shown by FIG. 2, modulator 34 includes an array of cells or pixels 44. Each pixel 44 includes an active area 46 from which light is emitted and a surrounding or perimeter hide layer 48 which constitutes one or more layers of light absorbing or opaque material extending between active areas 46. Hide layer 48 inhibits reflection of light from elements between active areas 46.

Figure 3:
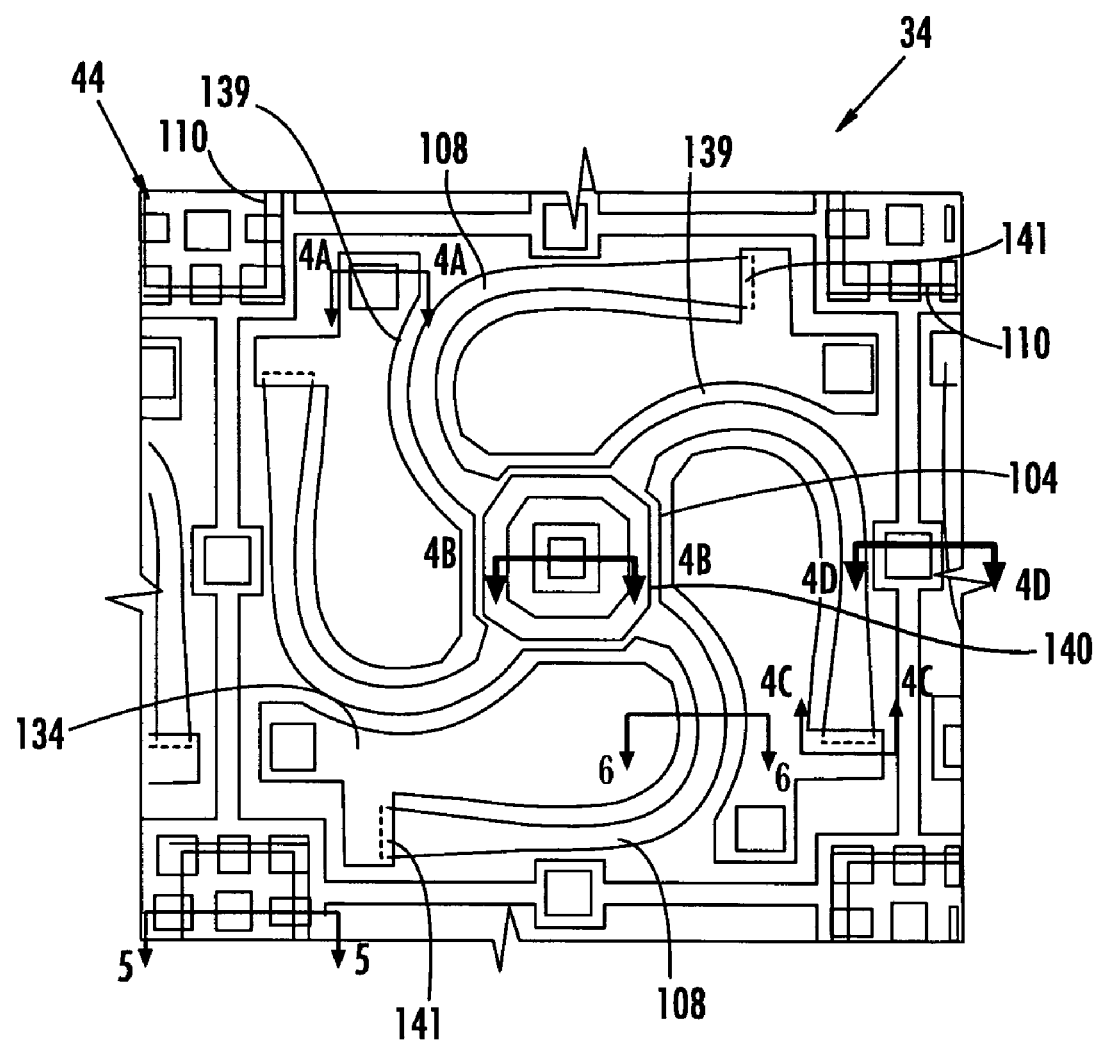
FIG. 3 is a top plan view of one example of a pixel of the light modulator of FIG. 1 with portions omitted for purposes of illustration according to an example embodiment.
Figure 5:
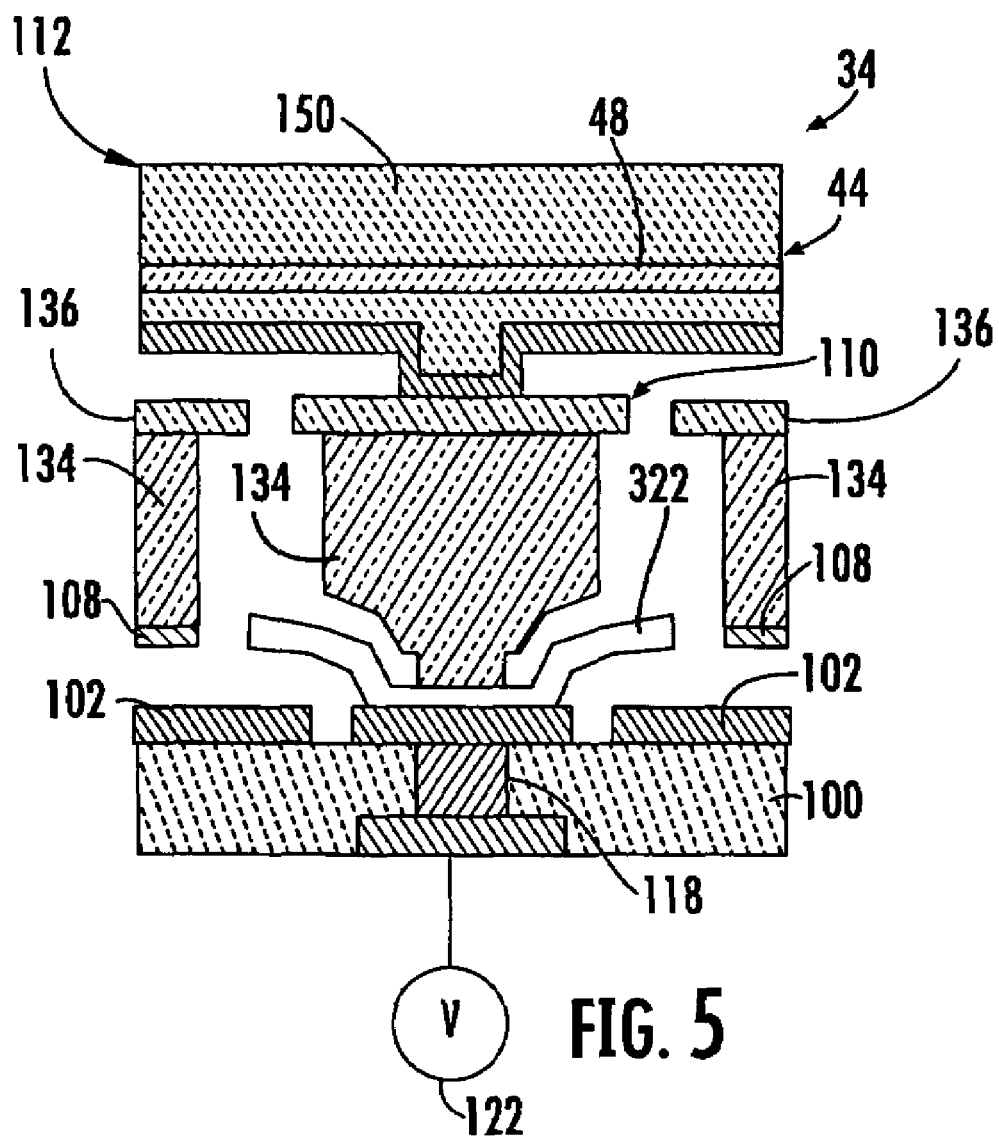
FIG. 5 is a sectional view of the pixel of FIG. 3 taken along line 5-5 according to an example embodiment.
Figure 6:
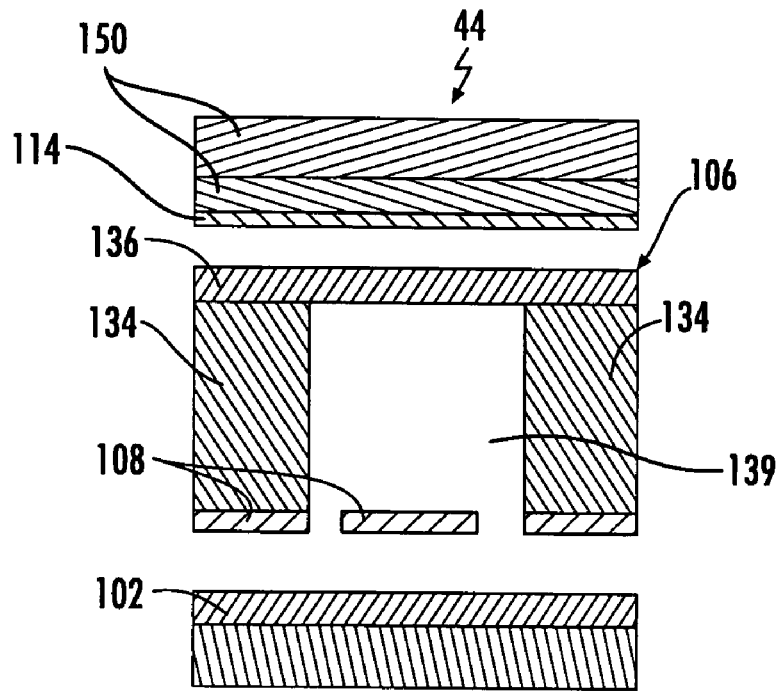
FIG. 6 is a sectional view of the pixel of FIG. 3 taken along line 6-6 according to an example embodiment.

FIGS. 3-7 illustrate one of pixels 44 in detail. FIG. 3 is a top plan view of pixel 44 with portions of pixel 44 omitted for purposes of illustration. FIG. 4A is a sectional view of a complete pixel 44 taken along line 4A-4A of FIG. 3. FIG. 4B is a sectional view of a complete pixel 44 taken along line 4B-4B of FIG. 3. FIG. 4C is a sectional view of a complete pixel 44 taken along line 4C-4C of FIG. 3. FIG. 5 is a sectional view of the complete pixel 44 taken along line 5-5 of FIG. 3. FIG. 6 is a sectional view of the complete pixel 44 taken along line 6-6 of FIG. 3. As shown by FIGS. 3-5, pixel 44 generally includes substrate 100, bottom conductive plate 102, support post 104, reflector 106, flexures 108, support posts 110, top structure 112 including partial reflector 114 and hide layer 48, conductive via 116 and conductive via 118. As further schematically illustrated by FIG. 4B, each pixel 44 further includes a switching device 120 configured to selectively connect a portion of the pixel 44 to a voltage source 122 in response to signals from controller 38.

Substrate 100 serves as a base or foundation for pixel 44. In particular embodiments, substrate 44 may be formed as part of a larger member or wafer serving as a foundation for a plurality of pixels 44. In one embodiment, substrate 100 is formed from silicon dioxide deposited or grown on a silicon wafer. The silicon wafer may include transistors, diodes and other active and passive integrated components to provide and integrated circuit which is connected to the pixel by vias 116 and 118. In other embodiments, other dielectric materials may be used for substrate 100 such as glass, alumina or silica.

Conductive plate 102 constitutes a layer of electrically conductive material capable of retaining a charge so as to create an electrostatic field. According to one embodiment, conductive plate 102 may be formed from TaAl. In other embodiments, other materials such as a wide range of metals, alloys and intermetallics may be employed.

Figure 7:
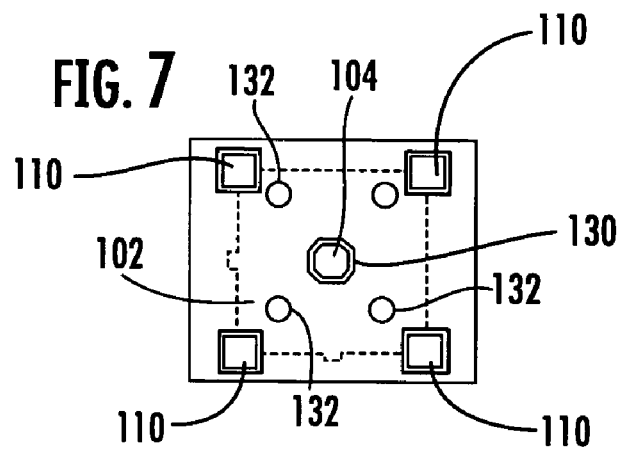
FIG. 7 is a top plan view of the pixel of FIG. 3 according to an example embodiment with portions removed for purpose of illustration.

Conductive plate 102 extends on substrate 100 (shown in FIG. 6) generally opposite to reflector 106 and partial reflector 114. As shown in FIG. 7, in one embodiment, conductive plate 102 extends in a continuous fashion about support post 104 and is electrically separated from support post 104 by space 130. In particular embodiments, space 130 may be filled with a dielectric material. As further shown by FIG. 7, in one embodiment, conductive plate 102 may additionally include openings 132 spaced about support post 104. Openings 132 facilitate contact of reflector 106 as a limit while reducing the likelihood of electrical shorting occurring between conductive plate 102 and reflector 106. Because conductive plate 102 continuously extends about support post 104 and substantially extends below an entirety of reflector 106, conductive plate 102 has a large area, reducing voltage levels for moving reflector 106 and reducing likelihood of stiction. Because lower voltages may be used, more compact and less expensive switching devices 120 may also be employed for each pixel 44.

Support post 104 constitutes a structure of one or more materials projecting from substrate 100 towards reflector 106 that is centrally located opposite to reflector 106. Support 104 connects flexures 108 to substrate 100. As shown in FIG. 4B, in one embodiment, support 104 has a portion cantilevered above conductive plate 102. In other embodiments, support 104 may have a reduced cantilevered portion or may omit such cantilevered portions. Although support 104 is illustrated as being generally square or octagonal in shape, support 104 may alternatively have other shapes and configurations.

In addition to supporting flexures 108, support 104 further conducts electrical charge to one or more of flexures 108. In particular, support post 104 is formed from one or more electrically conductive materials and is electrically connected to electrical via 116. Support post 104 is electrically separated from conductive plate 102 by space 130. As a result, electrical charge may be conducted from via 116 to flexures 108 and ultimately to reflector 106. In other embodiments, reflector 106 may be electrically charged in other manners.

Reflector 106 constitutes a structure of one or more layers which are movably supported by flexures 108 between conductive plate 102 and top structure 112. Reflector 106 is configured to reflect light that has passed through partial reflector 114 of top structure 112. Reflector 106 generally includes pixel plates 134, bumps 135 and reflective layer 136. Pixel plates 134 constitute one or more layers of electrically conductive material configured to support reflective layer 136. Because pixel plates 134 extend below a substantial portion of reflective layer 136, pixel plates 134 provide reflective layer 136 with enhanced rigidity permitting reflective layer 136 to be thinner. In one particular embodiment, pixel plates 134 are formed from TaAl. In other embodiments, other electrically conductive materials may be used to form pixel plates 134.

Reflective layer 136 constitutes one or more layers of material configured to provide a reflective face 138 which faces partial reflector 114. In addition to providing reflective face 138, reflective layer 136 further joins the separate pixel plates or segments 134 into a single stiff reflector having a suitable flatness and rigidity. In one particular embodiment, reflective layer 136 is configured to minimize differential stress across reflector 106 and has sufficient stiffness to support double cantilevered regions in the presence of electrostatic forces and typical film stresses. In one embodiment, reflective layer 136 is formed from multiple layers including a top highly reflective layer formed from material such as AlCu or other highly reflective materials such as Al or Ag. In one particular embodiment, reflective layer 136 includes at least 3 layers with AlCu on top and bottom. In such an embodiment, the stresses imposed on the two AlCu layers cancel to create a structure with balanced differential stress across its thickness for improved flatness after release, reducing the likelihood of warp. In other embodiments, reflective layer 136 as well as pixel plates 134, may be formed from other materials and may have other configurations.

As shown by FIG. 6, pixel plates 134 and reflective layer 136 combine to provide reflector 106 with channels 139 which are configured to receive flexures 108. Channels 139 provide head room between flexures 108 and reflective layer 136, facilitating substantially level or uniform raising and lowering of reflective layer 136 with the reduced likelihood of reflective layer 136 bottoming out against flexures 108. As shown by FIG. 3, channels 139 separate pixel plates 134 and outwardly extend from a central cavity 140 generally above the center post 104. As a result, flexures 108 may also outwardly extend from center post 104 to a point of connection with pixel plate 134 of reflector 106. Because channels 139 and cavity 140 facilitate the positioning of flexures 108 between pixel plates 134 opposite to reflective layer 136, flexures 108 may be provided with an increased length, reducing the stress as reflector 106 is raised and lowered. In the particular embodiment illustrated, channels 139 spiral outwardly from central cavity 140. As a result, flexures 108 may be provided with an even greater length and may be provided with an increased radius of curvature to reduce strain rate after displacement. In other embodiments, channels 139 and cavity 140 may have other configurations or may be omitted.

Flexures 108, sometimes referred to as hinges, constitute elongate flexible members coupled to support post 104 and outwardly extending from support post 104 to a connection with reflector 106. Flexures 108 are formed from one or more materials and are dimensioned such that flexures 108 have an appropriate stiffness enabling flexures 108 to elevate reflector 106 above conductive plate 102 while also facilitating movement of reflector 106 towards and away from conductive plate 102. As shown by FIG. 3, in the particular embodiment illustrated, flexures 108 outwardly spiral away from support post 104 and have an end 141 connected to reflector 106. Because flexures 108 outwardly spiral from center post 104, flexures 108 may have a greater length without increasing a size of pixel 44. In the particular embodiment illustrated, flexures 108 may be greater than or equal to half of a side length of pixel 44 without substantially reducing the active area (i.e., the area from which light is emitted from pixel 44). The longer length of flexures 108 reduce strain in flexures 108 during displacement of reflector 106. Because flexures 108 are spiraled, the radius of curvature of flexures 108 is also increased which reduces strain rates.

In one particular embodiment, flexures 108 are formed from TaAl and have a length of approximately 12 micrometers and a radius of curvature of about 5 micrometers. In one particular embodiment, each flexure 108 has a thickness of about 1,250 Å. With a negative 0.2 micrometer displacement at a temperature of 80 degrees Celsius, each flexure undergoes a maximum strain of about 0.1 percent.

In the particular embodiment illustrated, each flexure 108 is connected to reflector 106 at an enlarged end portion 141. Because end portions 141 are gradually enlarged to provide a smooth transition between end 141 and a main elongated portion of flexure 108, maximum strain in flexure 108 is reduced and strains are averaged over a larger area for a lower strain energy density. In the embodiment illustrated, this smooth transition is provided by a taper from end 141. In other embodiments, this smooth transition may be provided by a curve or arc on one or both edges of flexure 108 or a fillet. By lowering strain energy density at the connection between flexures 108 and reflector 106, creep may be reduced. In addition, by reducing maximum induced strain in flexures 108, tilting of reflector 106 that may result from manufacturing defects such as misalignment of the pixel to flexure connection may be reduced. In the particular embodiment illustrated, ends 141 are flared. In other words, end portion 141 has a gradual increase in width with the largest width located at a location in which flexure 108 is connected to reflector 106. The flaring of ends portions 141 reduce or eliminate any large radius of curvatures, further reducing strain.

Top structure 112 extends opposite to reflector 106 with reflector 106 extending between top structure 112 and conductive plate 102. Top structure 112 receives and transmits light to reflector 106. Top structure 112 includes clear layer 150, top bumps 152, partial reflector 114 and hide layer 48. Clear layer 150 constitutes one or more layers of transparent or clear material configured to support bumps 152, partial reflector 114 and hide layer 48. In one embodiment, clear layer 150 continuously extends across multiple pixels 44 of modulator 34. In one embodiment, clear layer 150 may be formed from glass. In other embodiments, clear layer 150 may be formed from other transparent dielectric materials.

Bumps 152 constitute projections extending from clear layer 150 towards reflective layer 136 of reflector 106. Bumps 152 are formed from a dielectric material and are configured so as to limit upward movement of reflector 106 with respect to partial reflector 114. In particular, bumps 152 space reflective layer 136 from partial reflector 114 to prevent or minimize electrical shorting and/or stiction therebetween. Bumps 152 are located along a perimeter of pixel 44 outwardly beyond partial reflector 114. In other embodiments, bumps 152 may be omitted.

Partial reflector 114 constitutes one or more layers of semi-transparent, semi-reflective material and one or more layers of electrically conductive material suspended relative to reflective face 138 of reflector 106 to form optical cavity 156. Optical cavity 156 is configured to have a varying thickness such that light emitted from pixel 44 may have wavelengths ranging from the entire portion of the visible spectrum. Partial reflector 114 cooperates with reflective face 138 to constructively interfere with light so as to allow the reflection of a particular range of the wavelengths of the light. Partial reflector 114 is additionally electrically conductive and configured to retain charge, enabling partial reflector 114 to be electrostatically biased to a voltage or charge to electrostatically actuate reflector 106 and to adjust optical cavity 156. In the particular embodiments illustrated, partial reflector 114 is formed from TaAl. In other embodiments, partial reflector 114 may be formed from other materials such as a wide range of metals, alloys and intermetallics.

Hide layer 48 constitutes one or more layers patterned across clear layer 150 along the perimeters of and between pixels 44. Hide layer 48 is configured to absorb light between pixels 44 to reduce stray light and maximize contrast. In one embodiment, hide layer 48 is formed from one or more thin film layers. In other embodiments, hide layer 48 may be formed from other light-absorbing materials.

Clearout holes 154 (shown in FIG. 4D) are formed in the clear layer 150 and allow the selective etching of sacrificial materials that are present during construction of the device but removed prior to operation of the device.

Support posts 110 (shown in FIG. 5) constitute one or more layers of materials configured to support and suspend top structure 112 relative to reflector 106 and conductive plate 102. In the particular embodiment illustrated, support posts 110 extend from substrate 100 to top structure 112. As shown by FIG. 3, support posts 110 are located at each of four corners of pixel 44. Except for outermost pixels 44 of modulator 34, each support post 110 extends between corners of four adjacent pixels 44 and supports top structure 112 for each of the four adjacent pixels 44. Because support posts 110 each support top structure 112 for four adjacent pixels 44, fewer support posts for supporting top structure 112 may be used, reducing fabrication complexity and the total space occupied by such support posts 110. Because the total space occupied by support post 110 is reduced, the extent of hide layer 48 may be reduced while the extent of partial reflector 114 and reflective face 138 may be enlarged, increasing the active area of pixel 44 to improve brightness and color saturation provided by pixel 44. In one embodiment, support post 110 is formed from multiple electrically conductive materials such that electrical charge may be transmitted through support posts 110 to partial reflector 114. In other embodiments in which partial reflector 114 is supplied with a charge by other mechanisms, such as from a peripheral of modulator 34, support posts 110 may include one or more intervening layers of dielectric materials.

Conductive via 116 (shown in FIG. 4B) constitutes an electrically conductive interconnect extending through substrate 100 and electrically connected between center post 104 and switch 120. Via 116 facilitates transmission of electrical charge to center post 104 which is further conducted to reflective layer 136 of reflector 106 through flexures 108 and pixel plates 134. In other embodiments, reflector 106 may be electrically charged in other fashions.

Electrically conductive via 118 (shown in FIG. 5) constitutes an electrical interconnect extending through substrate 100 and electrically interconnecting support post 110 to a voltage source. Via 118 enables electrical charge to be conducted to partial reflector 114 through support post 110. As a result, reflective layer 136 of reflector 106 and partial reflector 114 may be charged to distinct voltages such that electrostatic forces may be utilized to move reflector 106 to adjust optical cavity 156. In other embodiments, electrically conductive via 118 may have other configurations or may be omitted where partial reflector 114 is charged in other manners.

Switch 120 constitutes a device to selectively conduct charge from voltage source 122 to reflective layer 136 of reflector 106 through via 116 and center post 104 in response to control signals from controller 38. In one embodiment, switch 120 may constitute a thin film resistor. In other embodiments, switch 120 may constitute a metal-insulator-metal switching device or other switching devices.

Voltage source 122 constitutes a source of electrical charge for charging conductive layer 136 and partial reflector 114. In particular embodiments, voltage source 122 may also be electrically connected to conductive plate 102 to charge conductive plate 102. Although FIGS. 4A-4D and 5 illustrate a single voltage source 122 as electrically charging reflective layer 136 and partial reflector 114, distinct voltage sources may alternatively be utilized.

In operation according to one embodiment, controller 38 generates control signals directing switch 120 to selectively conduct charge from voltage source 122 to reflective layer 136. Voltage source 122 further electrically charges partial reflector 114 to a voltage different than the voltage of conductive plate 102. By varying the charge of reflective layer 136, controller 38 may control electrostatic forces between reflective layer 136 and conductive plate 102, as well as electrostatic forces between reflective layer 136 and partial reflector 114 to control movement of reflector 106. By controlling movement of reflector 106, controller 38 further controls a thickness of optical cavity 156 to control or adjust wavelengths of light emitted from the particular pixel 44. In one particular embodiment, conductive plate 102 is at zero volts, while voltage source 122 charges partial reflector 114 to approximately 15 volts. Controller 38 generates control signals causing switch 120 to vary the voltage of reflective layer 136 between 0 and 15 volts. When reflective layer 136 is charged to 15 volts, reflector 106 is attracted towards conductive plate 102 and there is no electrostatic force between reflector 106 and partial reflector 114. Thus, reflector 106 is moved towards conductive plate 102 to increase the thickness of optical cavity 156. Alternatively, when conductive layer 136 is at zero volts (i.e., no charge is being transmitted to conductive layer 136), reflector 106 is attracted to partial reflector 114, reducing the thickness of optical cavity 156. In other embodiments, conductive plate 102, reflective layer 136 and partial reflector 114 may be charged to other levels of voltage or may be charged in other manners so as to vary and control a thickness of optical cavity 156.

Figure 8A:
Figure 8B:
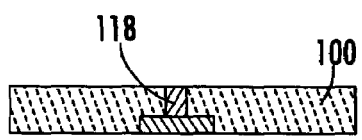
FIGS. 8B, 9B, 10B, 12B, 13B, 14B, 15B, 16B, 18, 19B, 20, 21B AND 22B are sectional views schematically illustrating formation of the pixel of FIG. 3 taken along line 5-5 according to an example embodiment.

FIGS. 8-22 are sectional views schematically illustrating one example method of forming pixel 44. FIGS. 8A, 9A, 10A, 11, 12A, 13A, 14A, 15A, 16A, 17, 19A, 21A and 22A illustrate the formation of that portion of pixel 44 shown in FIGS. 4A, 4B and 4C. FIGS. 8B, 9B, 10B, 12B, 13B, 14B, 15B, 16B, 18, 19B, 20, 21B and 22B illustrate the formation of that portion of pixel 44 shown in FIG. 5. As shown in FIGS. 8A and 8B, substrate 100 is provided. Substrate 100 constitutes a layer of one or more dielectric materials. In one embodiment, substrate 100 constitutes an SiO2 layer on silicon. In other embodiments, other materials may be used such as glass, alumina or silica. As further shown by FIGS. 8A and 8B, electrically conductive vias 116 and 118 are formed in substrate 100. As noted above, vias 116 and 118 connect each pixel to electrical switching devices or voltage sources. In one embodiment, CMOS circuitry (not shown) may be present to bring electrical signals to vias 116 and 118. This CMOS circuitry may provide the functionality of switch 120 and may provide some or all of the functionality of controller 38

Figure 9A:
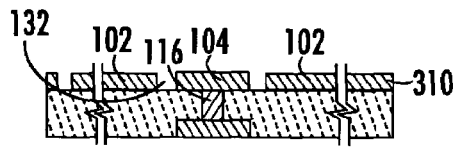
Figure 9B:
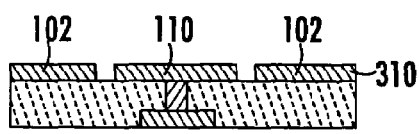

As shown by FIGS. 9A and 9B, a layer 310 of electrically conductive material is deposited or otherwise formed upon substrate 110. Portions of layer 310 are selectively removed to partition layer 310 so as to form conductive plate 102, portions of center post 104 and portions of corner post 110. In one embodiment, portions of layer 310 are selectively removed by appropriate masking and etching. In other embodiments, portions of layer 310 may be removed or may be selectively deposited in other fashions or using other techniques.

Figure 10A:
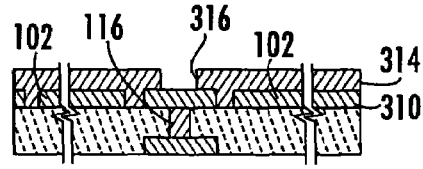
Figure 10B:
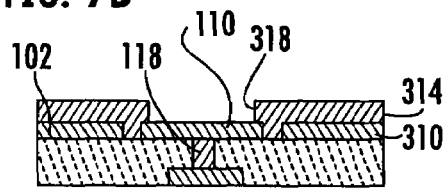
Figure 11:
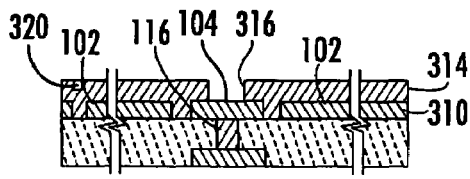

FIGS. 10A and 10B illustrate the deposition of a sacrificial layer 314 upon substrate 110 and layer 310. Sacrificial layer 314 is appropriately patterned so as to form openings 316 and 318 as shown in FIGS. 10A and 10B, respectively. As shown in FIG. 11, portions of sacrificial layer 314 are further removed to form openings 320. In one embodiment, openings 320 are formed by appropriately masking and etching of layer 314.

Figure 12A:
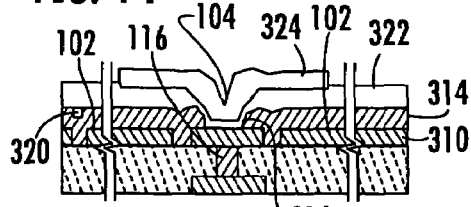
Figure 12B:
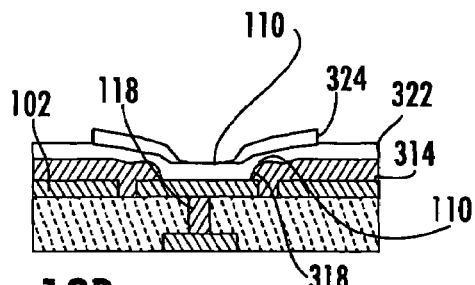

FIGS. 12A and 12B illustrate the deposition of a layer 322 of electrically conductive material upon and over layer 314 to form an uppermost portion of center post 104, flexures 108 and anti-stiction bumps 135. As shown by FIGS. 12A and 12B, layer 322 is deposited upon layer 310 through openings 316 and 318. Because portions of layer 322 make electrical contact with vias 116 and 118, respectively, through that portion of layer 310 forming support posts 104, the upper kink in layer 322 above support posts 104 has a reduced depth as compared to the formation of layer 322 directly upon vias 116 and 118. As a result, coverage of layer 322 over openings 316 and 318 is improved. FIGS. 12A and 12B also illustrate the subsequent deposition of sacrificial layer 324 and removal of portions of layer 324 to expose portions of layer 322 as shown. Sacrificial layer 324 serves to define flexures 108 as shown in FIGS. 4 and 6.

Figure 13A:
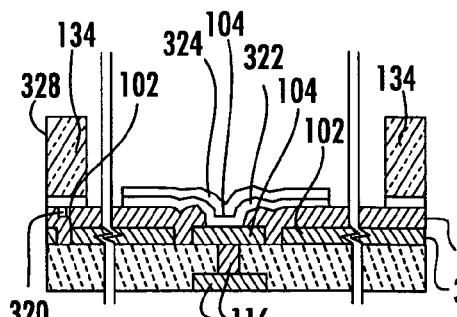
Figure 13B:
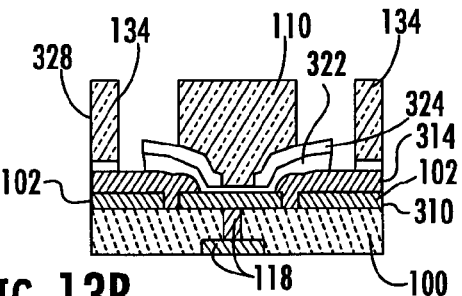
Figure 14A:
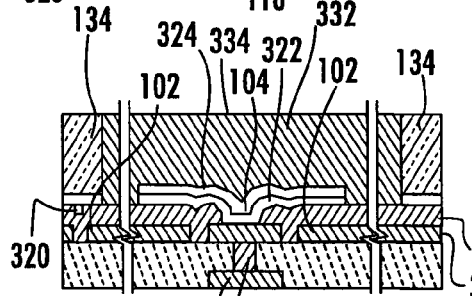
Figure 14B:
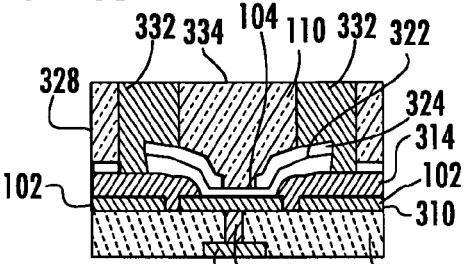

FIGS. 13A and 13B illustrate the deposition of a layer 328 of electrically conductive material. As shown by FIGS. 13A and 13B, portions of layer 328 are selectively removed, such as with a mask and etching, to form pixel plates 134 and a portion of each of corner posts 110. Portions of layer 322 are also removed, the flexures 108 being protected by the remaining portions of the sacrificial layer 324. As shown in FIGS. 14A and 14B, sacrificial layer 332 is subsequently deposited. Layer 332 along with layer 328 are planarized to provide a level surface 334. In one embodiment, layer 328 may constitute TaAl. In other embodiments, layer 328 may be provided by other electrically conducive materials such as a wide range of metals, alloys and intermetallics.

Figure 15A:
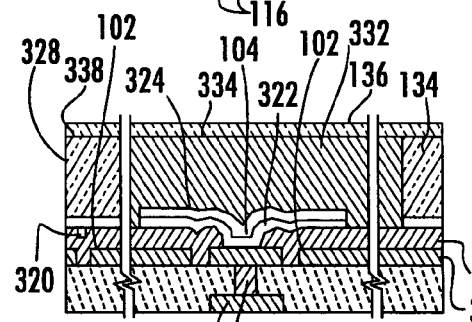
Figure 15B:
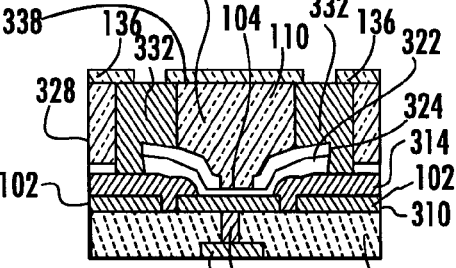

FIGS. 15A and 15B illustrate the deposition or formation of layer 338 upon surface 334. Layer 338 constitutes one or more layers providing reflective layer 136. In one embodiment, layer 338 includes a first lowermost layer of AlCu upon surface 334, an intermediate layer of TaAl and a top layer of AlCu. In other embodiments, layer 338 may have fewer or greater layer portions and may be formed from other electrically conductive and/or highly reflective materials. As shown by FIG. 15B, portions of layer 338 are removed, such as by appropriate patterning and etching, to separate reflective layer 136 from that portion of layer 338 forming corner post 110.

Figure 16A:
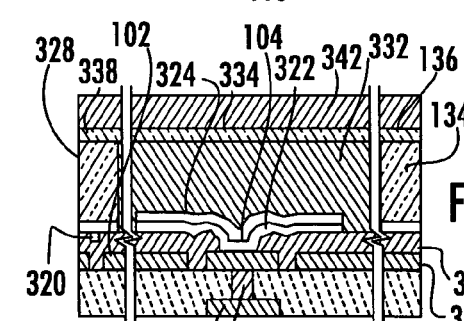
Figure 16B:
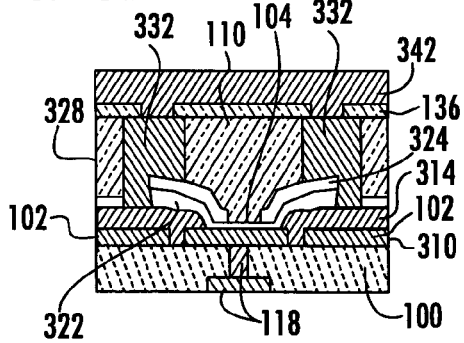
Figure 17:
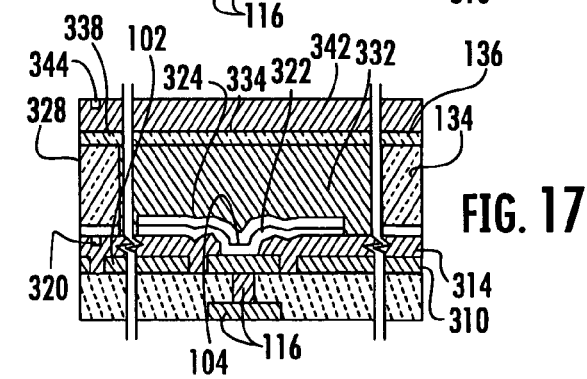
Figure 18:
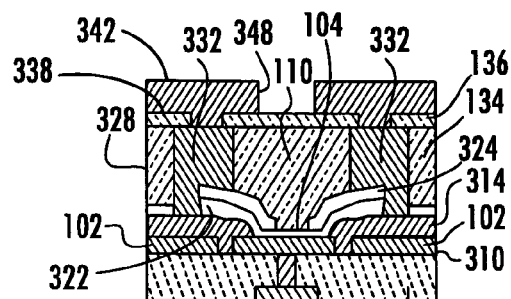

FIGS. 16A and 16B illustrate the deposition of sacrificial layer 342 upon layer 338. FIG. 17 further illustrates selective removal of portions of sacrificial layer 342, such as by etching, to form openings 344. As shown by FIG. 18, portions of layer 342 are further removed, such as by patterning and etching, to form opening 348, exposing portions of layer 338 that form portions of support posts 110. Openings 344 facilitate subsequent formation of bumps 152 (shown in FIG. 4A) while opening 348 facilitates subsequent formation and connection of top structure 112 (shown in FIG. 5) to corner support post 110. Portions of layer 342 opposite to reflective layer 136 serve facilitate the subsequent spacing of reflective layer 136 from partial reflector 114 (shown in FIG. 4B).

Figure 19A:
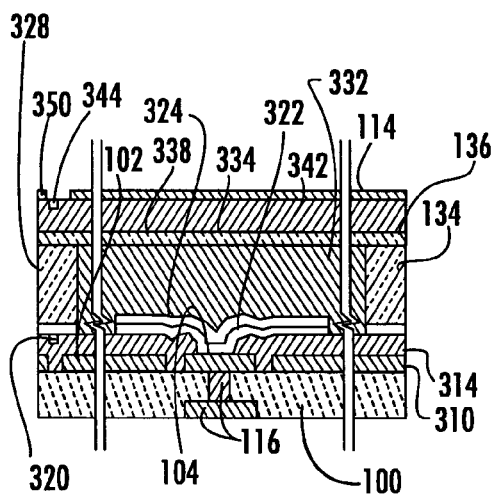
Figure 19B:
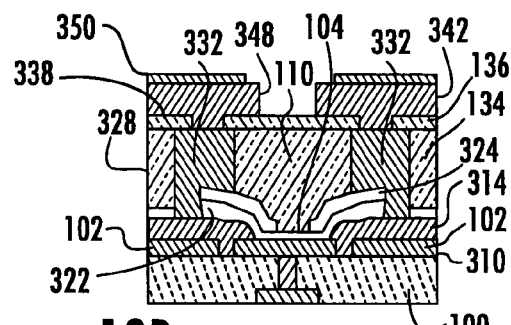
Figure 20:
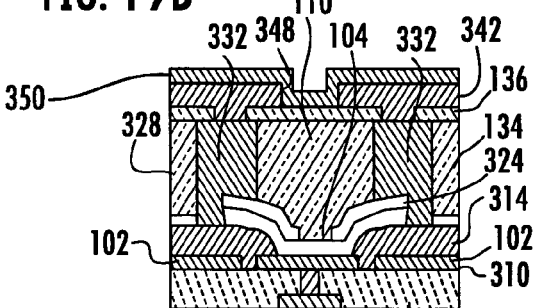

FIGS. 19A, 19B and 20 illustrate the deposition of layer 350 upon layer 342 and upon exposed portions of layer 338. In one embodiment, layer 350 constitutes a partially transparent, partially reflective material such as TaAl. In other embodiments, layer 350 may constitute other partially reflective materials. As also shown by FIG. 19A, portions of layer 350 are selectively removed, such as by masking and etching, to expose those portions of underlying layer 342 including openings 344. In other embodiments, layer 350 may be selectively deposited upon layer 342 to facilitate omission of subsequent removal of portions of layer 350. In some areas of the light-modulator 44, it may be beneficial to retain layer 350 in the support post 110 to create an electrical connection between via 118 and layer 350 as shown in FIG. 20B.

Figure 21A:
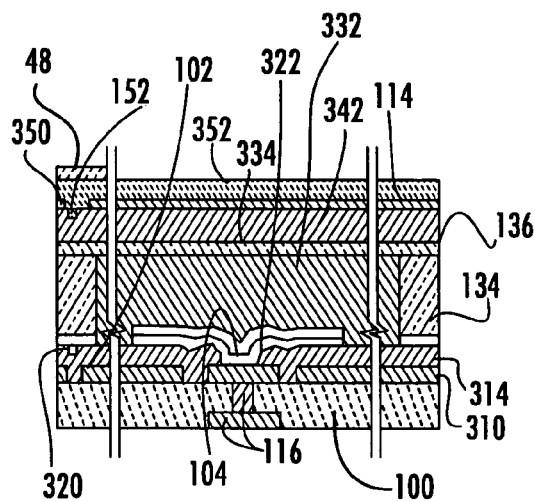
Figure 21B:
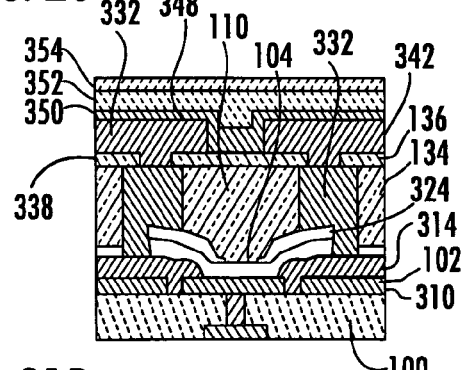

FIGS. 21A and 21B illustrate the deposition of layer 352 upon layer 350 and upon the exposed portions of layer 342. In one embodiment, layer 352 constitutes a layer of one or more transparent dielectric materials such as silicon. In other embodiments, layer 352 may be provided by other transparent dielectric materials such as silica, alumina or glass. As shown by FIGS. 21A and 21B, layer 352 forms bumps 152 and further provides a portion of clear layer 150.

FIGS. 21A and 21B further illustrate the deposition of layer 354 upon layer 352. Layer 354 constitutes one or more layers of light-absorbing or light-blocking materials configured to serve as hide layer 48. As shown by FIG. 21A, portions of layer 354 are selectively removed such as by photolithography and etching to expose portions of layer 352 generally opposite to partially reflector 114 and reflective layer 136.

Figure 22A:
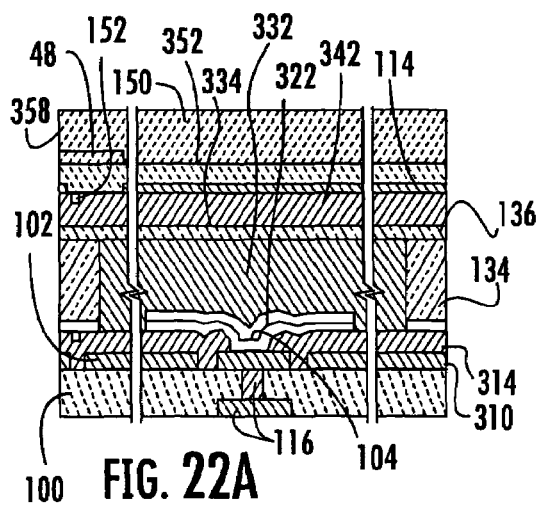
Figure 22B:
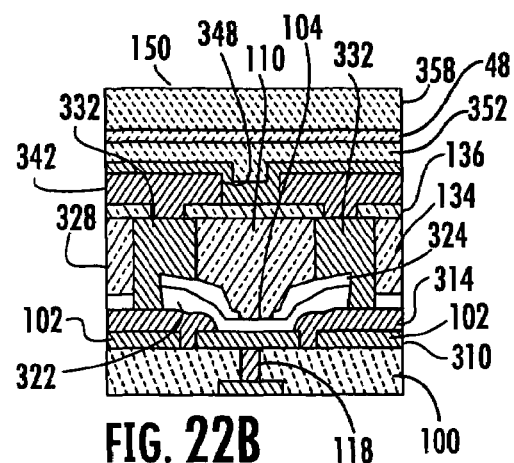

FIGS. 22A and 22B illustrate the addition of second clear layer 358 upon layer 354 and upon exposed portions of layer 352. Layer 358 constitutes one or more transparent dielectric materials such as silicon, silica, alumina or glass. Layer 358 further builds up clear layer 150 and protects hide layer 48. Thereafter, layer 358 is subsequently planarized and areas of 358 are selectively removed in regions 254 as shown in FIG. 4D. These holes provide access to remove the sacrificial films, which results in pixel 44 shown in FIGS. 3, 4A, 4B, 4C and 5.

Figure 23:
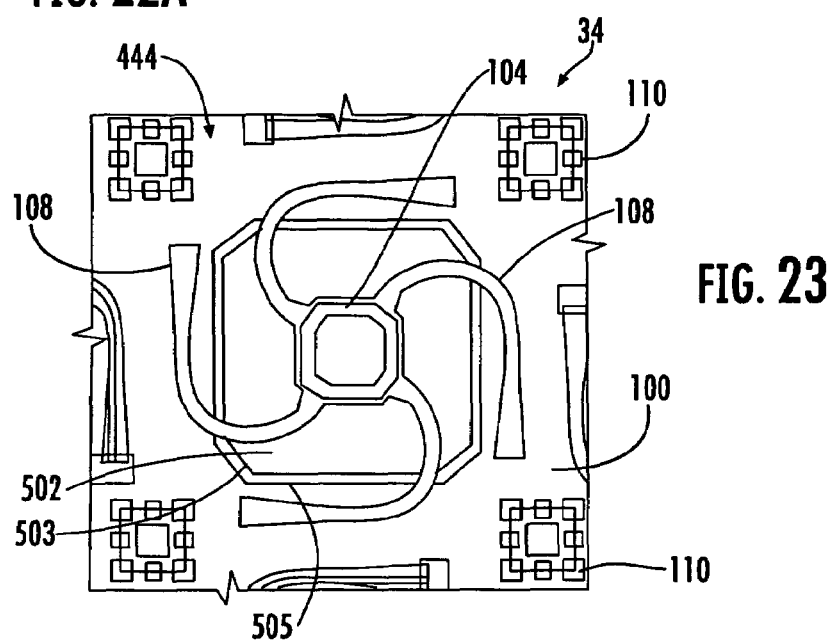
FIG. 23 is a top plan view of another embodiment of the pixel of FIG. 3 with portions removed for purpose of illustration according to an example embodiment.

FIG. 23 illustrates pixel 444, another embodiment of pixel 44 shown in FIG. 3. Pixel 444 is similar to pixel 44 except that pixel 444 includes conductive plate 502 in lieu of conductive plate 102. Those remaining portions of pixel 444 are similar to corresponding components of pixel 444. For purposes of illustration, FIG. 23 illustrates a portion of pixel 444 while omitting reflector 106 and top structure 112. FIG. 23 further omits illustration of a substantial portion of corner post 110. In particular, FIG. 23 illustrates pixel 444 after the formation of flexures 108 and prior to subsequent formation of additional layers.

As shown by FIG. 23, conductive plate 502 has a reduced size and is more centrally located as compared to conductive plate 102. Conductive plate 502 is configured so as to have a perimeter 503 more proximate to center post 104 as compared to a perimeter of conductive plate 102 (shown in FIG. 3). Because conductive plate 502 is more centrally located, differences in electrostatic moment that occur due to misalignment effects are reduced which further reduce force differentials across pixel 444 once tilting occurs. Because central conductive plate 502 is more centrally located, tilting due to misalignment of flexures 108 may be reduced. As a result, the amount of tilting with increased deflection is attenuated.

Figure 24A:
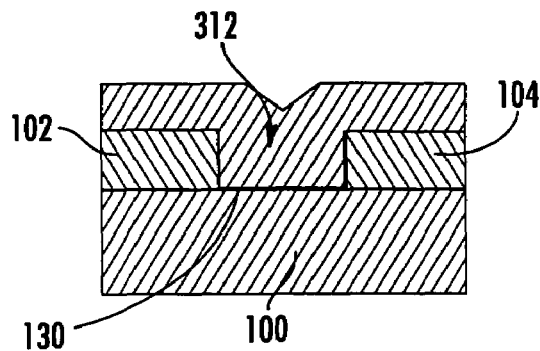
FIGS. 24A-24D are section views schematically illustrating formation of flexures of the pixel of FIG. 23 according to an example embodiment.

FIGS. 24A-24D are section views illustrating one example of a method for forming conductive plate 502. Similar to the method shown in FIG. 9A, layer 310 is deposited upon substrate 100 and portions of layer 310 are selectively removed to form conductive plate 102 and portions of center post 104 and corner post 110 (shown in FIGS. 9A and 9B, respectively). Opening 130 extends about center post 104 and defines a perimeter around conductive plate 102. Those portions of layer 310 (center post 104) inside opening 130 are electrically isolated from conductive plate 102. As shown in FIG. 24A, a sacrificial layer 507 is deposited upon layer 310 and within openings 130. Opening 132 in layer 130 is also treated in this same manner.

Figure 24B:
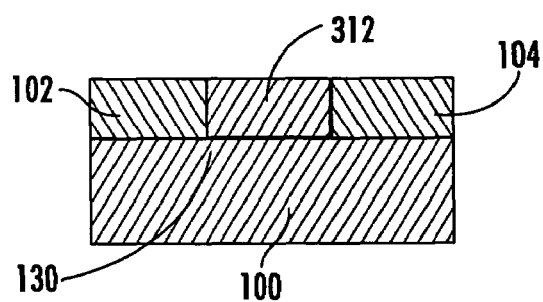
Figure 24C:
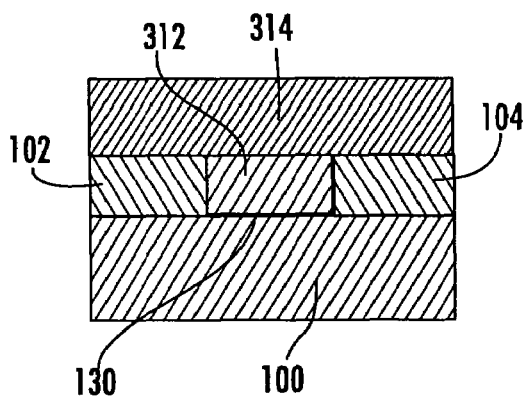
Figure 24D:
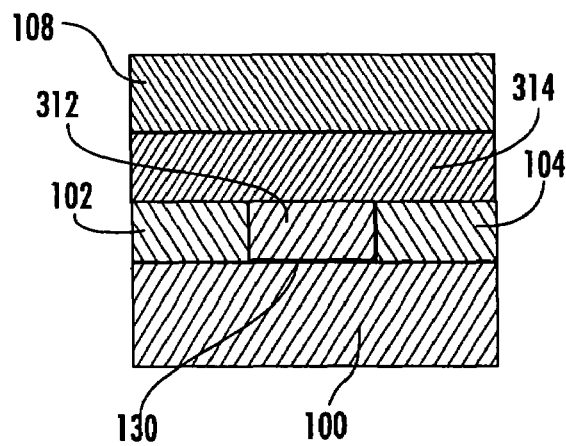

FIGS. 24B-24D illustrate the subsequent formation of flexures 108 over opening 130. As shown by FIG. 24B, sacrificial layer 312 is subsequently planarized and additional layer 314 of sacrificial material is deposited upon remaining portions of layer 312 and layer 310. As shown by FIG. 24D, layer 322 (described above with respect to FIGS. 12A and 12B) is deposited or formed upon sacrificial layer 314. Layer 322 constitutes materials configured to form flexures 108. The process shown in FIGS. 24A-24D minimizes or eliminates kinks in flexure 108 that may otherwise form across opening 130.

Figure 25:
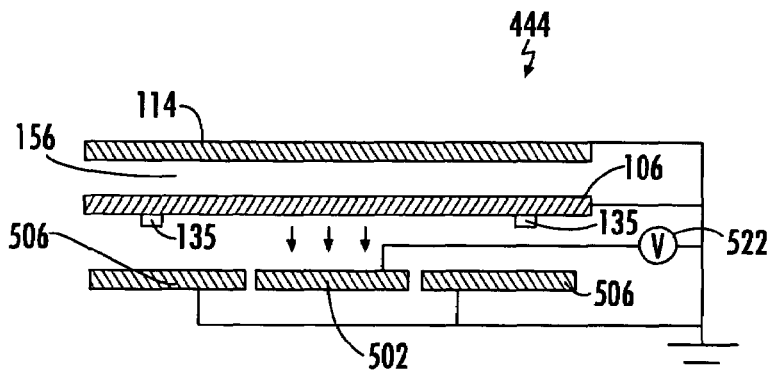
FIG. 25 is a sectional view schematically illustrating the pixel of FIG. 23 according to an example embodiment.

FIG. 25 schematically illustrates one example mode of operation for pixel 444. As shown in FIG. 25, outer conductive plate 506, reflector 106 and partial reflector 114 are each electrically connected to ground. In particular, partial reflector 114 may be connected to ground through corners posts 110 while reflector 106 may be connected to ground through center post 104 (shown in FIGS. 4A-4D). Central conductive plate 502 is electrically charged by a voltage source 522 through an electrical via (not shown) through substrate 110. By varying the voltage on plate 502, movement of reflector 106 relative to partial reflector 114 may be controlled to vary the thickness of optical cavity 156. Because reflector 106, partial reflector 114 and landing or outer conductive plate 506 are at the same voltage, stray electric fields across dielectrics and risk of shorting between electrodes is reduced. In other embodiments, pixel 444 may be actuated in other manners.

Figure 26:
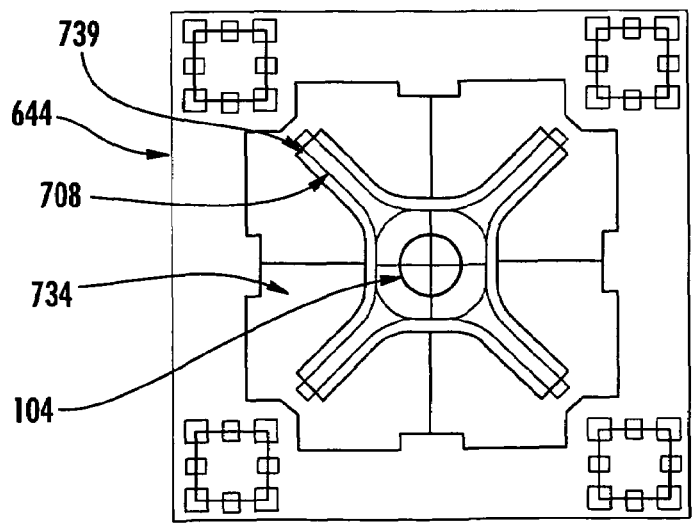
FIG. 26 is a top plan view of another embodiment of the pixel of FIG. 3 according to an example embodiment with portions removed for purpose of illustration.

FIGS. 26-29 illustrate other embodiments of pixels 44 and 444 shown in FIGS. 3 and 23. In particular, FIGS. 26-29 illustrate pixels 644, 844, 1044 and 1244, respectively. Pixels 644, 844, 1044 and 1244 are substantially similar to pixels 44 and 444 except that pixels 644, 844, 1044 and 1244 include distinct flexures and distinct pixel plates. For example, pixel 644 is similar to pixel 44 except that pixel 644 includes flexures 708 and pixel plate 734 in lieu of flexures 108 and pixel plates 134, respectively. Flexures 708 linearly extend outward from center post 104. As shown by FIG. 26, pixel plate 734 are connected to one another and are configured to continuously extend beneath reflective layer 136 (shown in FIG. 4A). Pixel plate 734 form channels 739 which receive flexures 708. As a result, reflective layer 136 (shown in FIG. 4A) has enhanced rigidity, enabling layer 136 to be thinner. Because flexures 708 outwardly extend from center post 104 in a linear fashion, the radius of curvature is reduced or eliminated, providing for reduced strain rates within flexures 708.

Figure 27:
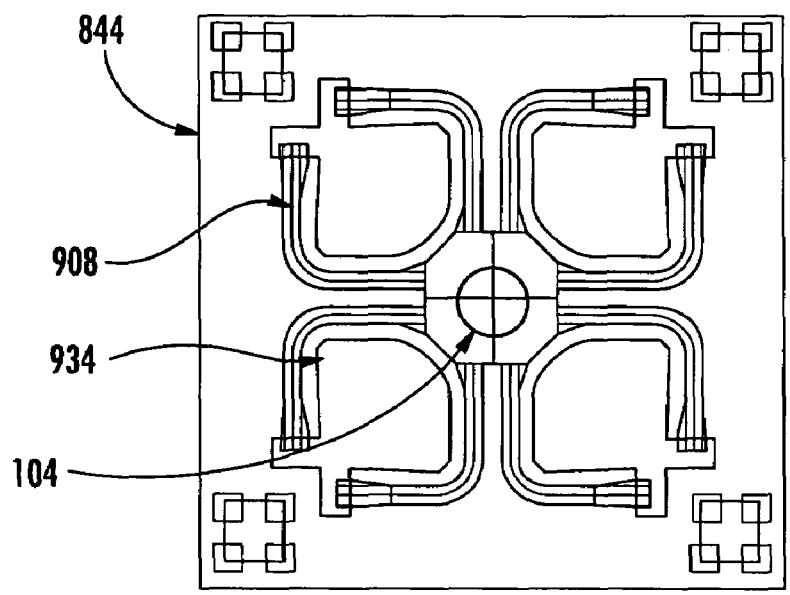
FIG. 27 is a top plan view of another embodiment of the pixel of FIG. 3 according to an example embodiment with portions removed for purposes of illustration.

As shown in FIG. 27, Pixel 844 includes flexures 908 and pixel plates 934 in lieu of flexures 108 and pixel plates 134. As shown by FIG. 27, pixel 844 includes eight flexures 908 rather than four flexures 108. The increased number of flexures 908 results in an increased overall stiffness of flexures 908, while retaining reduced strain and stress within each of flexures 908 during displacement of pixel plates 934 which are part of reflector 136 (shown in FIGS. 4A-4D).

Figure 28:
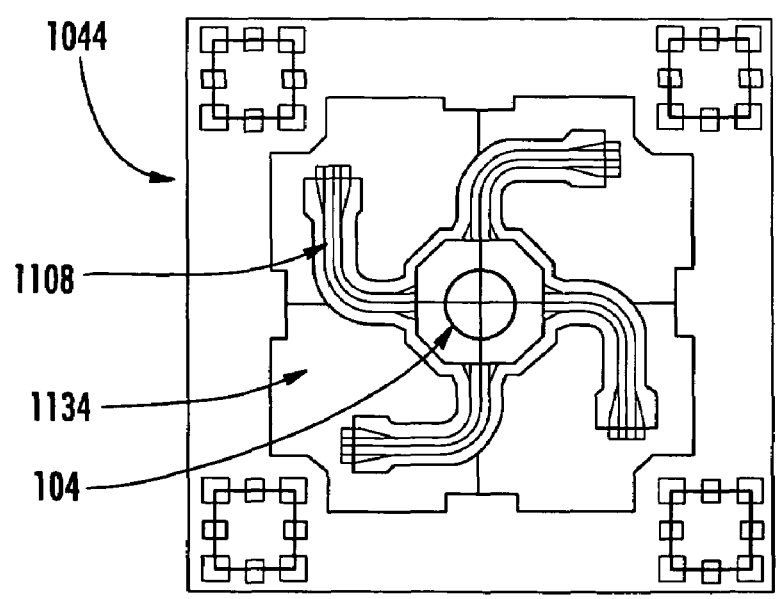
FIG. 28 is a top plan view of another embodiment of the pixel of FIG. 3 according to an example embodiment with portions removed for purposes of illustration.
Figure 29:
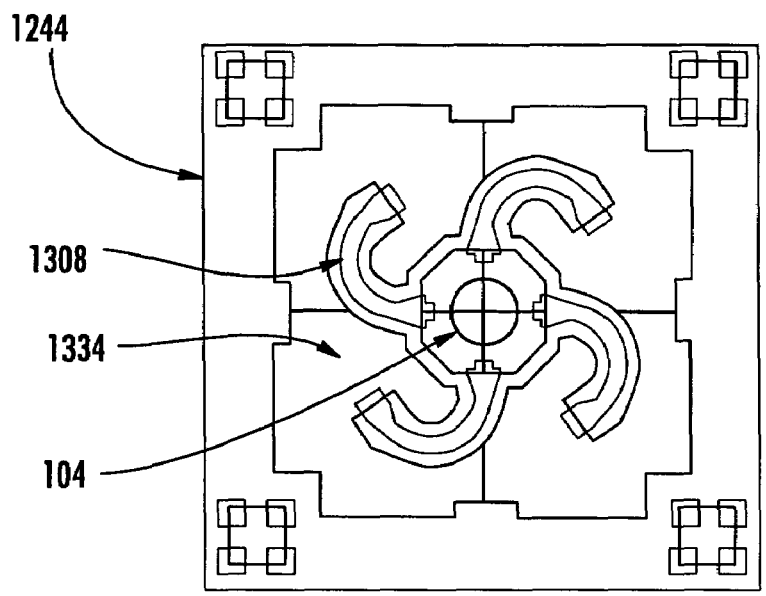
FIG. 29 is a top plan view of another embodiment of the pixel of FIG. 3 according to an example embodiment with portions removed for purposes of illustration.

Pixel 1044, shown in FIG. 28, includes flexures 1108 and pixel plates 1134 in lieu of flexures 108 and pixel plates 134, respectively. Likewise, pixel 1244, shown in FIG. 29, includes flexures 1308 and pixel plates 1334 in lieu of flexures 108 and pixel plates 134, respectively. Flexures 1108 and 1308 outwardly extend from center post 104 to a common point of connection with pixel plates 1134 and 1334, respectively. As a result, stress is more uniformly distributed over each pair of flexures 1108 or each pair of flexures 1308 to enhance uniform displacement of reflector 136 partially formed by pixel plate 1134 or pixel plates 1334.

Overall, pixels 44, 444, 644, 844, 1044 and 1244 offer several advantages. Because flexures 108, 708, 908, 1108, and 1308 are connected at a center of each pixel 444, 644, 844, 1044 and 1244 and are supported by center posts 104, flexures 708, 908, 1108, and 1308 are less sensitive to temperature variations and experience reduced levels of strain during displacement of reflector 106. Because channels are provided in reflector 106 for receiving flexures 708, 908, 1108, and 1308, flexure design flexibility is increased. In particular, flexures 708, 908, 1108, and 1308 may be provided with a larger radius of curvatures and increased lengths to reduce strains. Because the area of posts 110 for supporting top structure 112 is reduced, the active area of pixels 444, 644, 844, 1044 and 1244 is increased for potentially improved brightness and color saturation.

Figure 30:
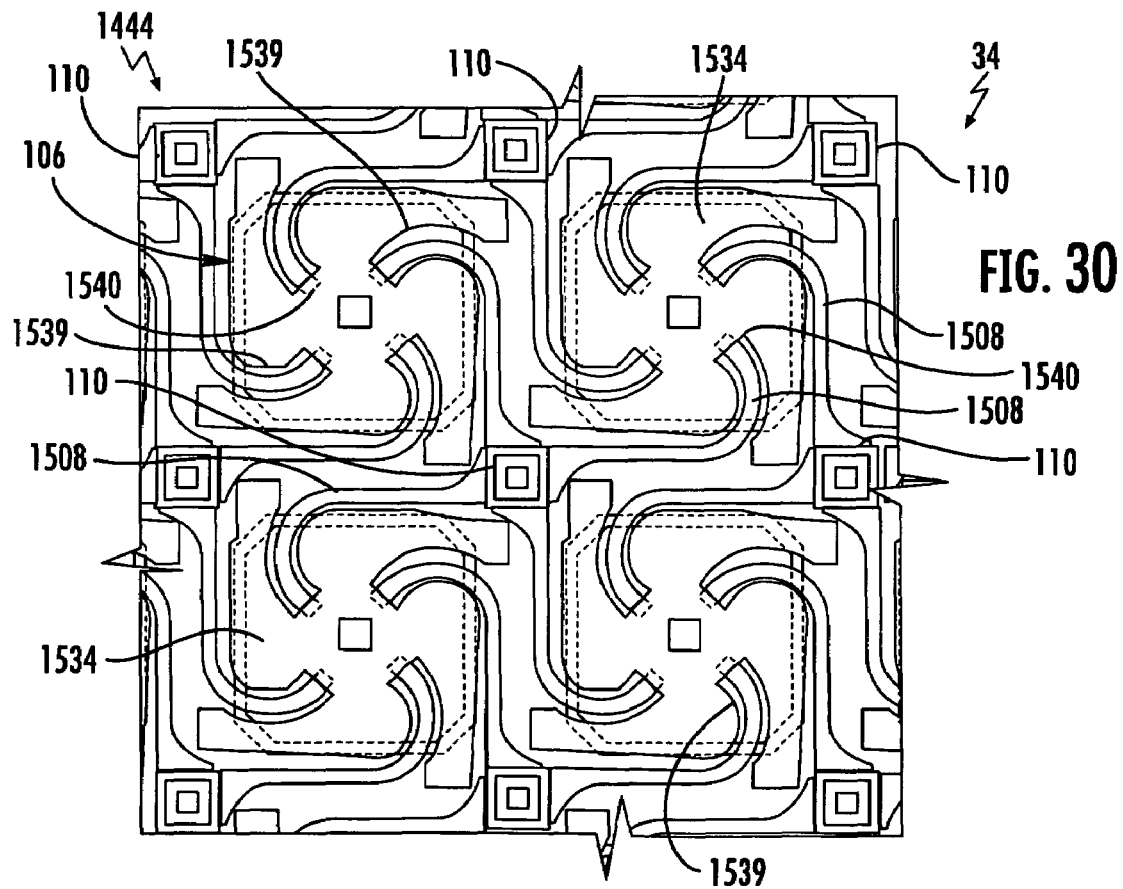
FIG. 30 is a top plan view of another embodiment of the pixel of FIG. 3 according to an example embodiment with portions removed for purposes of illustration.

FIG. 30 illustrates pixel 1444, another embodiment of pixel 44 shown and described with respect to FIG. 23. In particular, FIG. 30 illustrates four adjacent pixels 1444. Each of pixels 1444 is similar to pixel 444 except that each of pixels 1444 omits center post 104 and includes flexures 1508 and pixel plate 1534 in lieu of flexures 108 and pixel plates 134, respectively. Those portions of pixel 1444 which correspond to portions of pixel 444 are numbered similarly. As shown by FIG. 30, flexures 1508 extend from corner posts 110 to a connection point 1540 with pixel plate 1534. In the particular example illustrated, each corner post 110 supports four flexures which are in turn connected to four distinct pixel plates 1534 of four distinct pixels 1444. Each corner post 110 includes an electrically conductive portion, such as an electrically conductive via, that is electrically spaced or isolated from plate 102 (shown in FIG. 4B) of each pixel 1444 and which electrically connects flexures 1508 with a voltage source 122 (shown in FIG. 4B). As a result, controller 38 and switch 120 (shown in FIG. 4B) may be used to set or control the level of charge of voltage across pixel plates 1534. At the same time, charge applied to individual plates 102 of individual pixels may be varied.

In the particular example illustrated, each of flexures 1508 extends from its respective corner post 110 and is coupled to pixel plate 1534 of reflector 106 proximate to another one of corner posts 110. As shown in FIG. 30, in the embodiment illustrated, each of flexures 1508 extends from corner post 110 along an axis substantially parallel to a side of pixel 1444 until curving inward to connection point 1540. In the particular example illustrated, flexures 1508 inwardly curl within channels 1539 provided within pixel plate 1534. As a result, flexures 1508 have an increased length and increased radius of curvature to reduce stress and strain during displacement of reflector 106. Channels 1539 provide flexures 1508 with "head room", facilitating uniform displacement of reflector 106.

Pixel plate 1534 forms channels 1539 and continuously extends below reflective layer 136 (shown in FIGS. 4A-4D). Because pixel plate 1534 is continuous beneath reflective layer 136, reflective layer 136 is more rigidly supported, enabling reflective layer 136 (shown in FIGS. 4A-4D) to be thinner.

As further shown by FIG. 30, each corner post 110 supports multiple flexures 1508 utilized to support multiple reflectors 106 of adjacent pixels 1444. In the particular embodiment illustrated, each corner support post 110 supports four flexures 1508 which support four respective reflectors 106 of four adjacent pixels 1444. As a result, each pixel 1444 of modulator 34 utilizes one-quarter of each of four adjacent posts 110. In other words, each pixel 1444 utilizes a single post 110 per pixel. Because the number of support posts 110 utilized to support flexures 1508 is reduced, the extent of the surface area of modulator 34 occupied by such posts 110 or covered by hide layer 48 (shown in FIG. 4A) is reduced, increasing the overall active area of pixel 1444, i.e., the area of partial reflector 114 and reflective layer 136 (shown in FIGS. 4A-4D) for filtering light. Increasing the active area of pixels 44 of modulator 34 also increases brightness and color saturation that may be provided by pixels 1444 of modulator 34.

Figure 31:
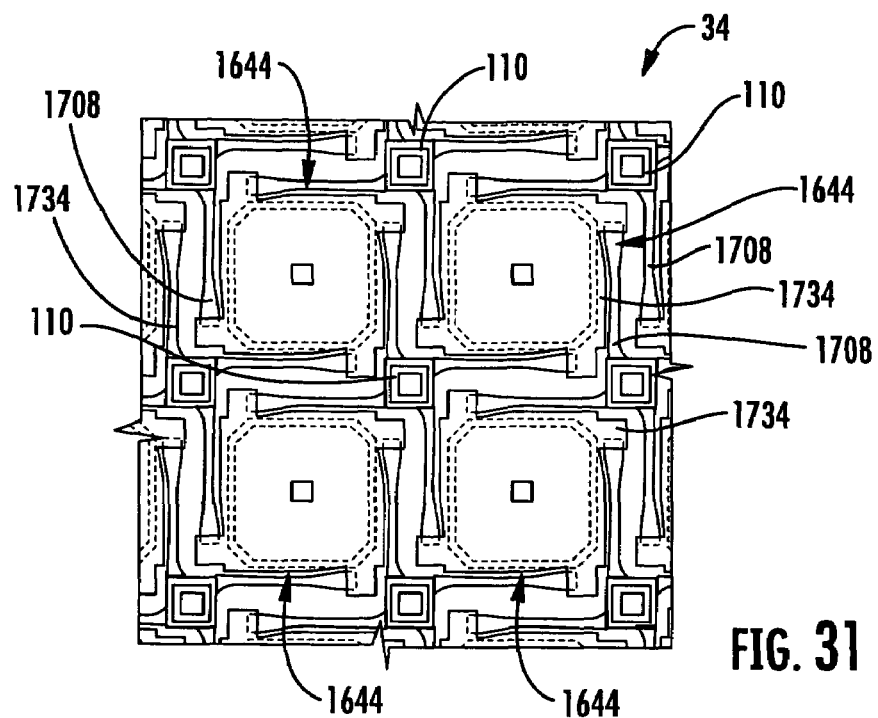
FIG. 31 is a top plan view of another embodiment of the pixel of FIG. 3 according to an example embodiment with portions removed for purposes of illustration.

FIG. 31 is a top view of pixel 1644, another embodiment of pixel 1444 shown in FIG. 30. Pixel 1644 is similar to pixel 1444 except that pixel 1644 includes flexures 1708 and pixel plate 1734 in lieu of flexures 1508 and pixel plate 1534, respectively. Those remaining elements of pixel 1644 that correspond to elements of pixel 1444 are numbered similarly. As with pixel 1444, portions of pixel 1644, such as top structure 112 and reflective layer 136 (shown in FIGS. 4A-4D) are omitted for purposes of illustration. Flexures 1708 are similar to flexures 1508 except that flexures 1708 are substantially linear (i.e. an infinite radius of curvature) from corner posts 110 to their respective pixel plate 1734. As a result, stress and strain within flexures 1708 may be reduced during displacement of reflector 106. However, because flexures 1708 extend from one corner post 110 and are connected to pixel plate 1734 of reflector 106 proximate to another of corner posts 110, flexures 1708 have an increased length, further reducing stress and strain. Because pixel plate 1734 is substantially continuous below reflective layer 136 (shown in FIG. 4A), reflective layer 136 is more rigidly supported and may be thinner.

Figure 32:
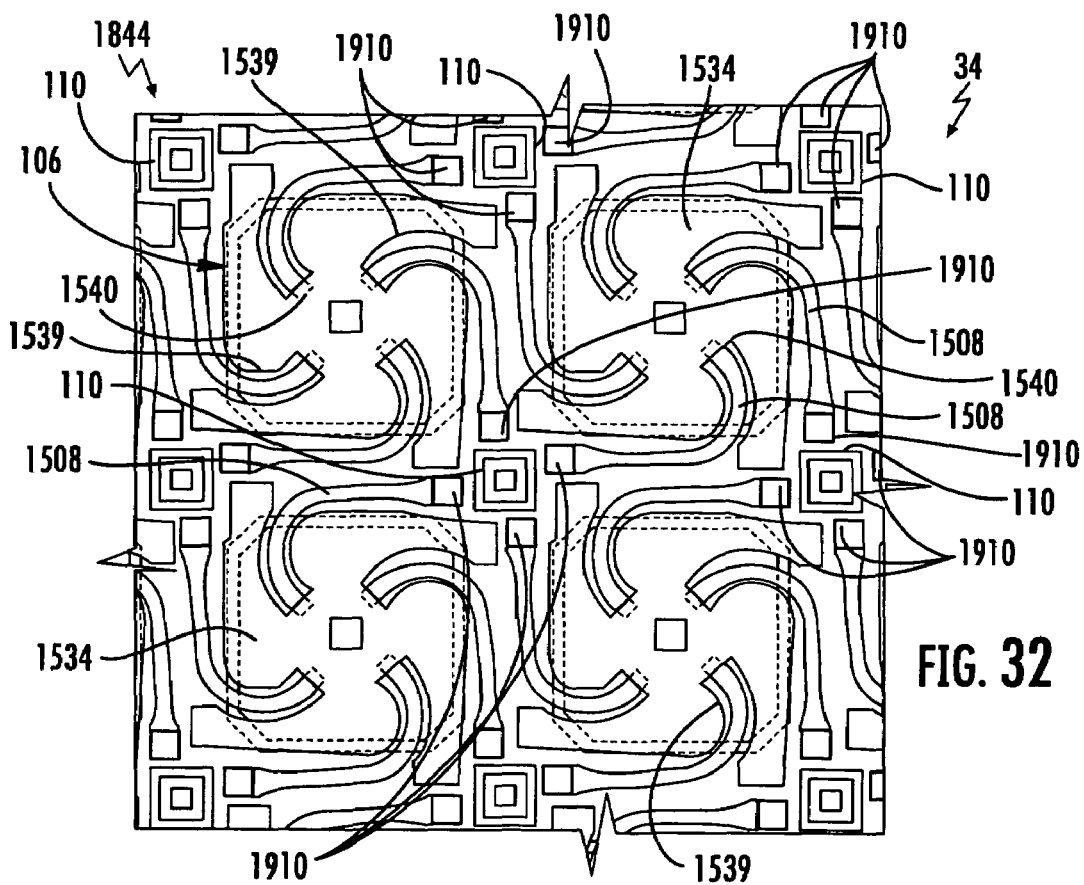
FIG. 32 is a top plan view of another embodiment of the pixel of FIG. 3 according to an example embodiment with portions removed for purposes of illustration.

FIG. 32 is a top view of pixel 1844, another embodiment of pixel 1444 shown in FIG. 30. Pixel 1844 is similar to pixel 1444 except that pixel 1844 includes flexure support posts 1910. Those remaining elements of pixels 1844 that correspond to elements of pixel 1444 are numbered similarly. As with pixel 1444, portions of pixel 1844, such as top structure 112 and reflective layer 136 (shown in FIGS. 4A-4D) are omitted for purposes of illustration. Flexure support posts 1910 constitute posts extending from a base or foundation of pixel 1844, such as substrate 100 to an associated flexure 1508. Each post 1910 is or includes a portion that is electrically insulated or separated from conductive plate 102 of pixel 1844, and that electrically interconnects flexure 1508 (and ultimately pixel plate 1534) to voltage source 122 (shown in FIG. 4B). As a result, controller 38 (shown in FIG. 4B) and switch 120 (shown in FIG. 4B) may be used to selectively charge individual adjacent pixel plates 1534 to distinct charges. In such embodiments, conductive plate 102 (shown in FIG. 4B) of adjacent pixels 1844 may be set at a common charge. In particular embodiments, adjacent conductive plates 102 may also be charged to distinct voltages.

Figure 33:
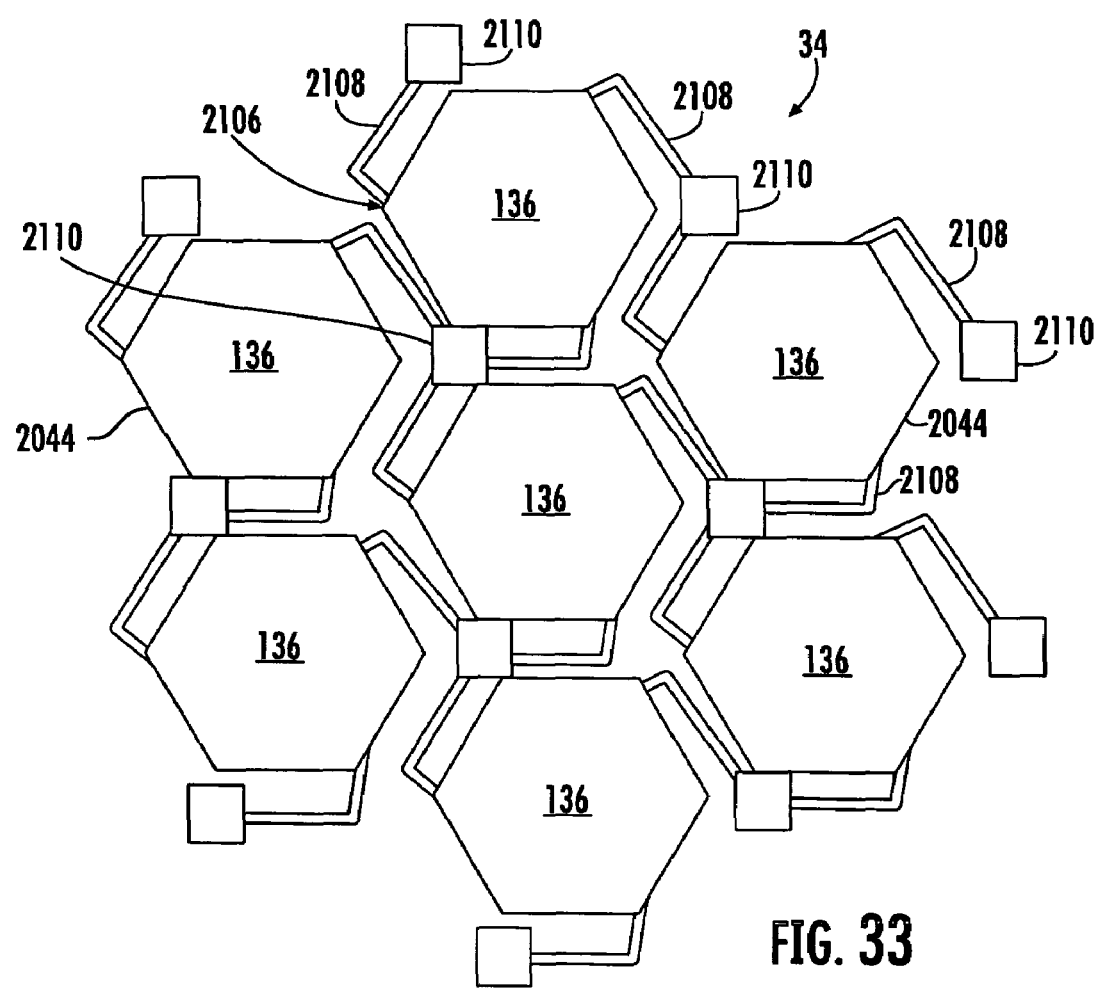
FIG. 33 is a top plan view of yet another embodiment of the pixel of FIG. 3 according to an example embodiment with portions removed for purposes of illustration.

FIG. 33 schematically illustrates pixel 2044, another embodiment of pixel 1444 shown in FIG. 30. Pixel 2044 is similar to pixel 1444 except that pixel 2044 includes reflector 106, flexures 2108 and support posts 1910. Although not shown, each pixel 2044 additionally includes an underlying conductive plate such as conductive plates 502, 506 or conductive plates 102 and an overlying support structure including a partial reflector, such as partial reflector 114 and a hide layer such as hide layer 48 (shown in FIG. 4A). Each reflector 2106 is similar to reflector 106 except that reflector 2106 has a polygonal configuration. In the particular example illustrated, reflector 2106 is hexagonal in shape. Reflectors 2106 are configured such that such reflectors may be closely packed to one another with sides parallel to one another. In the particular example illustrated, each reflector 2106 has a top reflective layer, such as reflective layer 136 and one or more underlying pixel plates such as pixel plate 134 (shown in FIG. 3) or such as pixel plate 1534 (shown in FIG. 17). Such underlying pixel plates may include channels in which flexures 2108 extend to increase the length and radius of curvature of such flexures 2108 for reduced stress and strain.

Flexures 2108 are similar to flexures 1508 shown in FIG. 30. Flexures 2108 extend from support post 2110 and are connected to reflectors 2106. Flexures 2108 are configured to movably support reflectors 2106 for movement in a uniform fashion relative to an underlying conductive plate and an overlying partial reflector. In one particular embodiment, flexures 2108 may be formed from an appropriate material having an appropriate thickness and rigidity so as to movably support reflector 2106 in response to electrostatic forces created by the application of voltages between reflector 2106 and the underlying conductive plate and the overlying partial reflector. In one embodiment, flexures 2108 may be formed from TaAl. In other embodiments, flexures 2108 may be formed from other materials.

Support post 2110 constitute structures extending from underlying substrate or conductive plate that are configured to support flexures 2108. In the particular example illustrated, support posts 2110 are located between the corners of adjacent pixels 2044. Excluding outermost posts 2110, each post 2110 is configured to support at least three flexures 2108 for movably supporting three distinct reflectors 2106 for three distinct pixels 2044. As a result, each pixel 2044 utilizes one-third of each of three posts 2110. As a result, pixels 2044 of modulator 34 utilize a single post 2110 per pixel. As with modulator 34 employing pixels 1444 and pixels 1644 as shown in FIGS. 30 and 31, respectively, modulator 34 employing pixels 2044 may have a lesser surface area covered by hide layer 48 (shown in FIG. 4A) and may have a larger active area (i.e., the area of partial reflector 114 and reflective layer 136) for enhanced brightness and color saturation. Although pixel 2044 is illustrated as having reflectors 2106 having six sides (and corresponding partial reflectors 114 and reflective layer 136 also having six sides), in other embodiments, pixels 2044 may have conductive plates, reflectors and partial reflectors having other multi-sided geometries with intermediate support posts supporting greater than three flexures each to also reduce the number or area of support posts utilized to support reflectors using such flexures.

Although the present invention has been described with reference to example embodiments, workers skilled in the art will recognize that changes may be made in form and detail without departing from the spirit and scope of the invention. For example, although different example embodiments may have been described as including one or more features providing one or more benefits, it is contemplated that the described features may be interchanged with one another or alternatively be combined with one another in the described example embodiments or in other alternative embodiments. Because the technology of the present invention is relatively complex, not all changes in the technology are foreseeable. The present invention described with reference to the example embodiments and set forth in the following claims is manifestly intended to be as broad as possible. For example, unless specifically otherwise noted, the claims reciting a single particular element also encompass a plurality of such particular elements.

What is claimed is:

1. A system comprising:
   at least one first electrically conductive layer having a first reflective face;
   a support centrally located opposite the at least one first electrically conductive layer;
   a plurality of flexures extending from the support and coupled to the at least one first electrically conductive layer;
   at least one second electrically conductive layer opposite the at least one first electrically conductive layer; and
   a control system configured to establish an electrical potential between the at least one first electrically conductive layer and the at least one second electrically conductive layer such that the first reflective face uniformly moves towards and away from the at least one second conductive layer.

2. The system of claim 1 further comprising a partial reflective layer opposite to and spaced from the first reflective face.

3. The system of claim 1, wherein the flexures outwardly spiral from the support.

4. The system of claim 1, wherein at least one of the plurality of flexures has an enlarged mounting portion coupled to the at least one first conductive layer.

5. The system of claim 4, wherein the at least one of the plurality of flexures having the enlarged mounting portion includes a main portion smoothly transitioning to the enlarged mounting portion.

6. The system of claim 1, wherein the at least one first conductive layer includes a second opposite face having a central portion and channels extending from the central portion, wherein the flexures extend from the central portion within the channels.

7. The system of claim 1 further comprising:
   a second reflector including a third electrically conductive layer and a second reflective base;
   a second support centrally located opposite the second reflector;

a second plurality of flexures extending from the second support and coupled to the second reflector;
a second fourth electrically conductive layer opposite the second reflector;
a third reflector including a fifth electrically conductive layer and a third reflective base;
a third support centrally located opposite the third reflector;
a third plurality of flexures extending from the third support and coupled to the third reflector;
a sixth electrically conductive layer opposite the third reflector; and
a support post directly supporting first partial reflector, the second partial reflector and third partial reflector; wherein said first, second, and third partial reflectors are disposed opposite to and spaced from the first, second, and third reflective faces, respectively.

8. The system of claim 1, wherein the plurality of flexures includes at least three flexures.

9. A MEMs structure comprising:
a first reflector;
a second reflector;
a third reflector;
a support post between the first reflector, the second reflector and the third reflector;
a first flexure extending from the support post and coupled to the first reflector;
a second flexure extending from the support post and coupled to the second reflector; and
a third flexure extending from the support post and coupled to the third reflector;
wherein the first flexure spirals from the support post towards a central portion of the first reflector.

10. The MEMs structure of claim 9, wherein at least one of the second and third flexures spirals from the support post towards a central portion of its respective reflector.

11. A MEMs structure comprising:
at least one partial reflector;
a first reflector opposite the at least one partial reflector;
a second reflector opposite the at least one partial reflector;
a third reflector opposite the at least one partial reflector;
a support post between the first reflector, the second reflector and the third reflector supporting the at least one partial reflector;
a flexure support proximate the support post; and
a flexure extending from the flexure support to the first reflector.

* * * * *

UNITED STATES PATENT AND TRADEMARK OFFICE
CERTIFICATE OF CORRECTION

PATENT NO. : 7,471,441 B1      Page 1 of 1
APPLICATION NO. : 11/450639
DATED : December 30, 2008
INVENTOR(S) : James R. Przybyla et al.

It is certified that error appears in the above-identified patent and that said Letters Patent is hereby corrected as shown below:

In column 15, line 3, in Claim 7, after "a" delete "second".

In column 15, line 13, in Claim 7, after "supporting" insert -- a --.

In column 15, line 13, in Claim 7, delete "the" and insert -- a --, therefor.

In column 15, line 14, in Claim 7, after "and" insert -- a --.

Signed and Sealed this

Twenty-eighth Day of July, 2009

JOHN DOLL
*Acting Director of the United States Patent and Trademark Office*